(12) United States Patent
Lanser et al.

(10) Patent No.: US 7,528,335 B2
(45) Date of Patent: May 5, 2009

(54) LIGHT ASSEMBLY FOR VEHICLE INTERIORS

(75) Inventors: Michael L. Lanser, Holland, MI (US); David J. Hooker, Zeeland, MI (US); Paul T. Vander Kuyl, Holland, MI (US); David L. Hiemstra, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 208 days.

(21) Appl. No.: 11/522,581

(22) Filed: Sep. 18, 2006

(65) Prior Publication Data

US 2008/0067049 A1 Mar. 20, 2008

(51) Int. Cl.
*H01H 3/00* (2006.01)

(52) U.S. Cl. .................... 200/339; 200/252
(58) Field of Classification Search ................ 200/339, 200/540, 547, 252
See application file for complete search history.

(56) References Cited

U.S. PATENT DOCUMENTS

| | | | |
|---|---|---|---|
| 3,519,775 A | 7/1970 | Weremey | |
| 4,139,746 A | 2/1979 | Farrell et al. | |
| 4,316,067 A | 2/1982 | Whiteman, Jr. | |
| 4,319,100 A | 3/1982 | Tallody | |
| 5,557,081 A * | 9/1996 | Clevenger et al. | 200/16 C |
| 5,735,392 A | 4/1998 | Shirasaka | |
| 5,824,977 A * | 10/1998 | Takano et al. | 200/16 C |
| 5,950,812 A | 9/1999 | Tanacan et al. | |
| 6,013,885 A | 1/2000 | Kowalczyk | |
| 6,380,500 B1 | 4/2002 | Lin | |
| 6,444,930 B1 | 9/2002 | MacDonald et al. | |
| 6,459,060 B1 | 10/2002 | Bartok | |
| 6,479,776 B2 | 11/2002 | Nakase et al. | |
| 6,576,855 B2 | 6/2003 | Levendis et al. | |
| 6,743,997 B2 | 6/2004 | Schmidt et al. | |
| 6,797,905 B1 | 9/2004 | Wang et al. | |
| 6,833,521 B2 | 12/2004 | Nishikawa | |
| 6,857,357 B2 | 2/2005 | Fujii | |
| 6,894,242 B2 * | 5/2005 | Müller et al. | 200/568 |
| 7,297,889 B2 * | 11/2007 | Bornhorst et al. | 200/336 |
| 2007/0029055 A1 * | 2/2007 | Joseph | 160/105 |

* cited by examiner

*Primary Examiner*—Michael A Friedhofer
*Assistant Examiner*—Lisa N Klaus
(74) *Attorney, Agent, or Firm*—Price, Heneveld, Cooper, DeWitt & Litton, LLP (57) ABSTRACT

A light assembly for interiors of motor vehicles and the like includes a three-way sliding switch having a switch member that is movable to at least three positions corresponding to operating states of the switch. The switch includes an electrically conductive movable contact member that selectively engages conductive members to provide the different electrical states of the switch. The movable contact member also engages a detent structure and forms a three-position detent tending to retain the switch member in the selected position. Thus, the electrically conductive material of the movable contact member provides an electrical function and a mechanical detent function to thereby reduce the complexity and associated cost of the switch.

20 Claims, 5 Drawing Sheets

LIGHT ASSEMBLY FOR VEHICLE INTERIORS

BACKGROUND OF THE INVENTION

Various types of vehicle interior lights, such as dome lights, have been developed. Dome lights or other vehicle interior lights may be connected to a switch or sensor that determines if one or more vehicle doors are open or closed, and be configured to turn on when a vehicle door is opened. Such interior lights may be operably connected to a three-position switch that controls the interior light or lights. Three-position switches of this type may include an ON position wherein the vehicle interior light is turned on regardless of whether a vehicle door is open or closed. Such switches also may include a second position wherein the vehicle interior light is turned on if one or more vehicle doors are open, and turned off if all vehicle doors are closed. Three-position switches may also include a third position that turns the vehicle interior light or lights off regardless of whether the vehicle door is in an open or closed position. Various electrical circuits and the like for implementing this light control arrangement are known.

Known three-position switches may include a mechanical detent device in addition to the electrical contacts. The mechanical detent retains the switch in the selected position and provides tactile feedback to a user concerning the position and/or change of position of the switch. Known three-position switches tend to be relatively complex due to the need to provide three different electrical switch states while also providing a mechanical detent having the proper amount of resistance to provide tactile feedback to a user and retain the switch in a selected position.

Accordingly, a three-position switch alleviating the drawbacks of known three-position switches would be advantageous.

SUMMARY OF THE INVENTION

One aspect of the present invention is an interior light assembly for vehicles including a base structure configured to be mounted in an interior of a vehicle. A switch member is movably interconnected with the base structure. The switch member is movable relative to the base structure between an ON position, an OFF position and an automatic, door-controlled position wherein the light is turned on when a vehicle door is open, and turned off when a vehicle door is closed. The switch member includes a first detent corresponding to the ON position, an "automatic" detent corresponding to the automatic position and an "off" detent corresponding to the OFF position of the switch member. The interior light assembly further includes an electrical circuit including first and second electrically conductive contacts on the base structure adjacent the switch member. The electrical circuit is configured to receive a signal indicative of whether or not a vehicle door is opened or closed to control the light when the switch is in the automatic position. The light assembly further includes an electrically powered light source operably connected to the electrical circuit and a source of electrical power. An electrically conductive third contact on the base structure engages the first detent and the first contact when the switch member is in the ON position and forms a first electrical connection with the first contact. The third contact engages the "off" detent when the switch member is in the OFF position, and the third contact does not form an electrical connection with the first and second contacts when the switch member is in the OFF position. The third contact engages the "automatic" detent and the second contact when the switch member is in the automatic position and forms a second electrical connection with the second contact. The third contact engages the "on" detent, the "automatic" detent, and the "off" detent and elastically deforms when the switch member is in the ON position and the automatic position, such that the third contact tends to remain in contact with the first and second contacts when the switch member is in the on and automatic positions, and also tends to remain out of contact with the first and second contacts when the switch member is in the OFF position. The electrical circuit is configured to turn the light source on if the switch member is in the ON position regardless of whether or not a vehicle door is closed. The electrical circuit turns off the light source when the switch member is in the OFF position regardless of whether a door is open or closed. The electrical circuit turns the light source on when the switch member is in the automatic position and a signal to the electrical circuit indicates a vehicle door is open. The electrical circuit turns the light source off when the switch member is in the automatic position and a signal to the electrical circuit indicates a vehicle door is closed. It will be understood that the first ON position may be referred to as the "ON" position, and the second ON position may be referred to as the "door" or "automatic" position. The terms "first" and "second" as used herein do not imply any type of limitation such as sequence, position orientation, or the like.

Another aspect of the present invention is an interior light assembly for vehicles including a base structure for mounting in an interior of a vehicle. A switch member is movably mounted to the base structure for movement between an ON position, an automatic position, and an OFF position. The light assembly also includes an electrically conductive circuit associated with the base structure and a light source coupled to the circuit. First and second electrically conductive contacts are connected to the electrical circuit, and a third electrically conductive contact member is connected to the base structure. The third contact member elastically deforms upon engagement with the switch member when the switch member is in the ON position into a first configuration wherein the third contact member contacts the first contact. The deformation of the third contact member forms a detent tending to retain the switch member in the ON position.

Yet another aspect of the present invention is a three-position sliding electrical switch assembly including a base structure and electrical conductors associated with the base structure. A switch member is movably mounted to the base for movement between first, second, and third positions. First and second electrical contacts are coupled to the electrical conductors. The switch assembly further includes a detent structure having a plurality of notches on a selected one of the base structure and the switch member. A third electrical contact contacts the first contact when the switch member is in the first position, and the third electrical contact contacts the second contact when the switch is in the second position. . The third electrical contact is out of contact with the first contact and the second contact when the switch member is in the third position. The third contact operably engages the detent structure and forms a detent tending to retain the switch member in the first, second and third positions upon movement of the switch member to a selected one of the first, second, and third positions.

These and other features, advantages, and objects of the present invention will be further understood and appreciated

DETAILED DESCRIPTION OF PREFERRED EMBODIMENT

Figure 3:
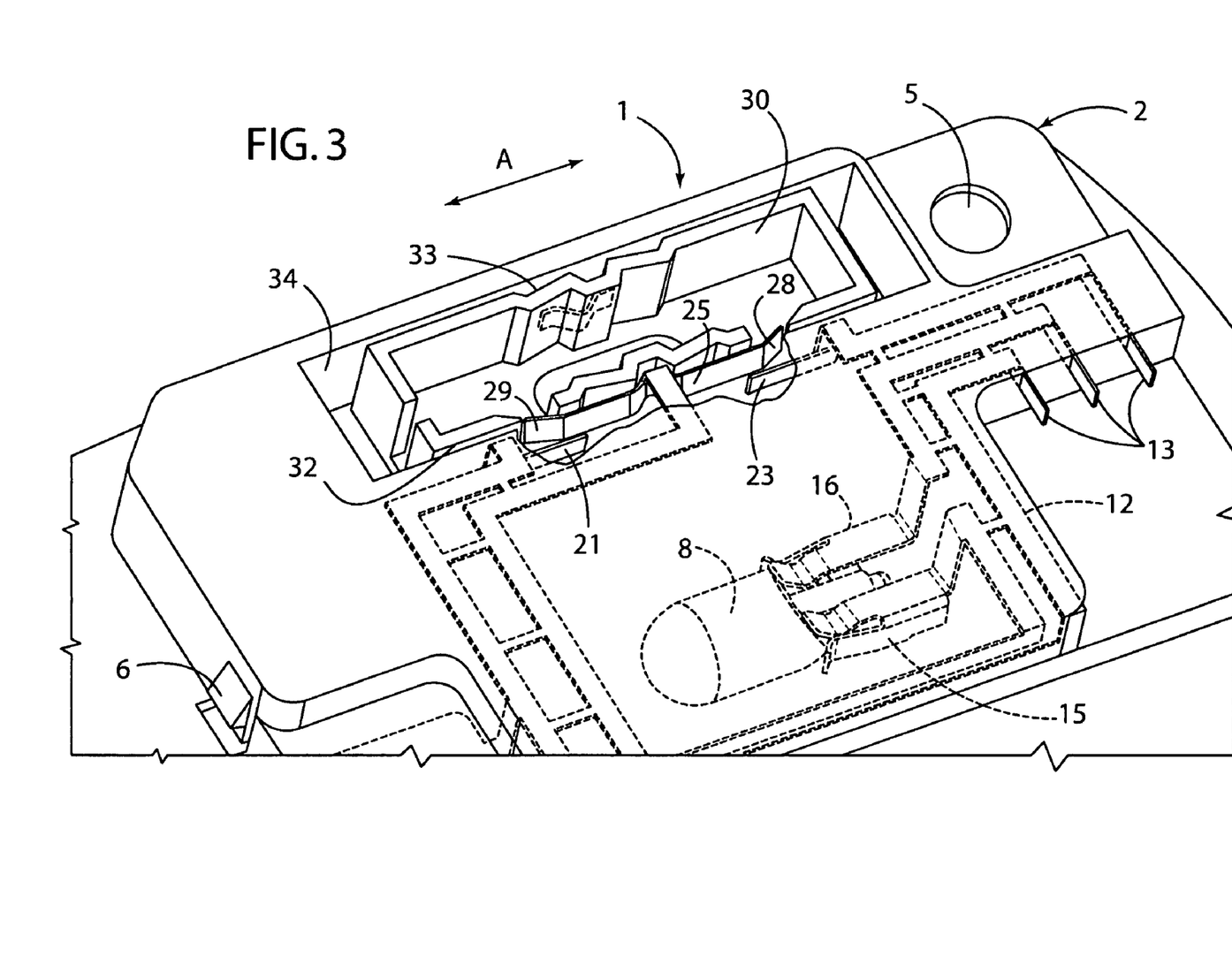
FIG. 3 is a partially fragmentary perspective view of the switch of FIG. 1 from another angle.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
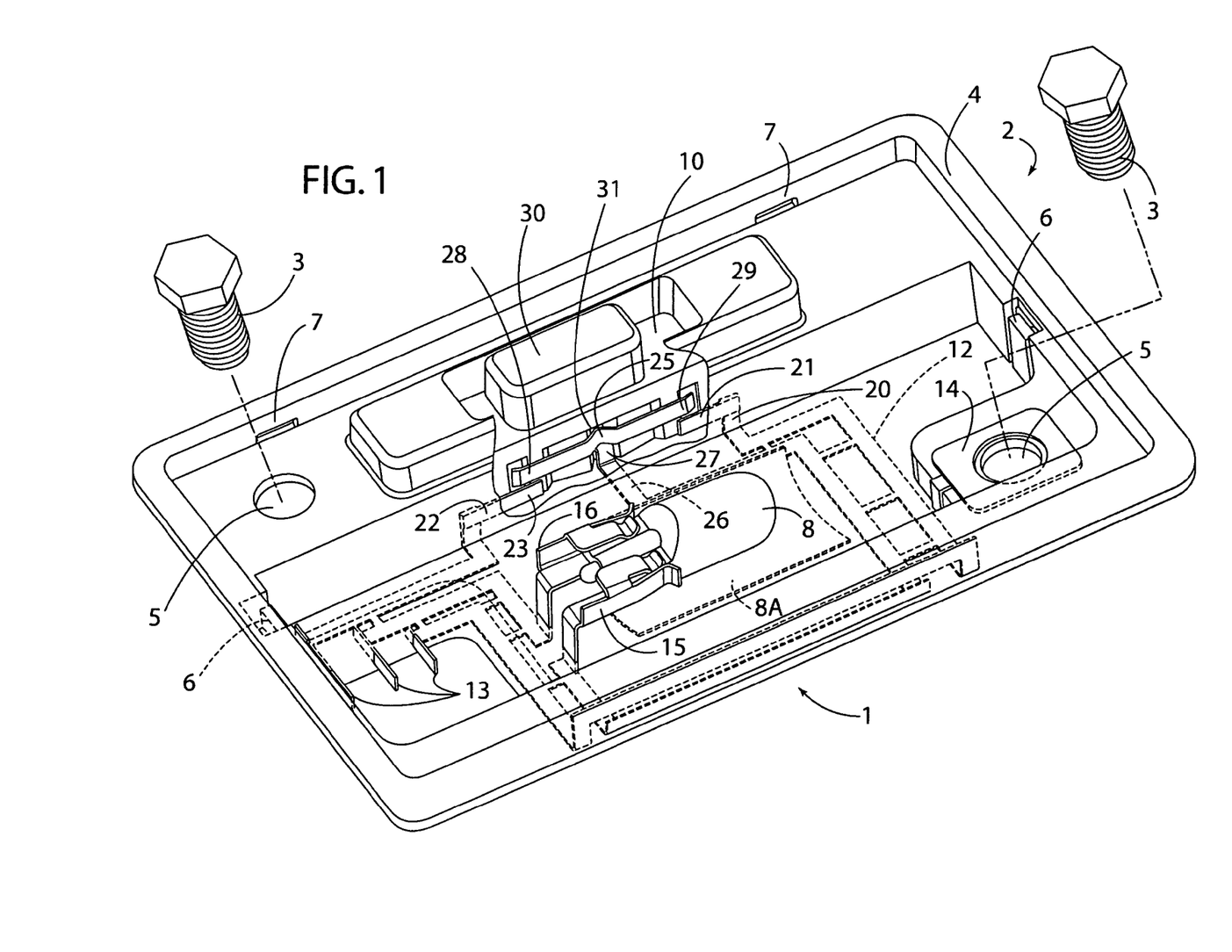
FIG. 1 is a partially fragmentary perspective view of an interior light assembly according to one aspect of the present invention.

With reference to FIG. 1, a light assembly 1 for vehicle interiors and the like includes a base structure 2 and a switch member 30 that is slidably connected to the base structure 2. As described in more detail below, first and second electrical contacts 21 and 23, respectively, form an electrical connection when contacted by arms 28 and 29 of third electrical contact 25. In addition to providing an electrical connection, third contact 25 also resiliently engages detent notches on switch member 30 to form a mechanical detent tending to retain switch member 30 in a selected one of three positions. Because third contact 25 forms both an electrical connection and a mechanical detent in a single part, a complex arrangement including separate detent and electrical components is not needed. Base structure 2 is made of polymer or other suitable material, and it is configured to be mounted to a vehicle interior via conventional threaded fasteners such as screws 3 or the like that extend through openings 5 in base 2. The base structure 2 includes a lower side 4 that faces a vehicle interior when light assembly 1 is installed to a vehicle roof. It will be understood that the light assembly 1 is shown upside-down in FIG. 1 relative to the orientation of the light assembly 1 when it is installed to the ceiling of a vehicle interior (FIG. 3), and terms such as "upper" and "lower" refer to the components when in an installed orientation. Conventional snap-type connectors 6 or the like may also be utilized to retain the light assembly 1 to the ceiling of a vehicle or to other structures when light assembly 1 and/or the switch assembly are utilized in other applications. With reference back to FIG. 1, one or more openings 7 or the like provide for mounting of a light-transmitting lens or sheet (not shown) that extends over a portion of lower side 4 of base 2 and covers a light source such as a light bulb 8, and a reflector 8A directs light from bulb 8 to the area to be illuminated.

A plurality of conductive elements 12 are molded into the base 2, and form an electrical circuit that interconnects the vehicle power source (not shown), light bulb 8, and three-way switch 10. Electrically conductive circuit elements 12 include electrical connectors 13 that plug into a receptacle (not shown) to interconnect the conductive circuit elements 12 to the electrical circuits of the vehicle (not shown). A conductive pad 14 is also electrically connected to the conductive elements 12, and electrically grounds the conductive elements 12 to the vehicle chassis via a screw 3 when light assembly 1 is installed in a vehicle. Electrical conductors 15 and 16 extend from base structure 2, and provide an electrical socket-type connection of a known configuration for electrically and mechanically connecting bulb 8 to the circuit elements 12. A first portion 20 of electrical circuit element 12 protrudes from the base 2, and first electrical contact 21 extends transversely from the first portion 20. (See also FIG. 7). The first contact 21 may be integrally formed with the electrically conductive elements 12 forming the electrical circuit embedded in base structure 2. A second portion 22 of the electrically conductive elements 12 protrudes from base 2, and includes a transverse end portion forming second electrical contact 23. Another portion of the electrically conductive elements 12 protrudes from the base structure 2 and forms a third electrical contact 25. The third contact 25 includes a base portion 26 that is embedded in the polymer base 2, an upwardly extending intermediate portion 27 that is not encapsulated by the polymer base structure 2, and a pair of oppositely extending arms 28 and 29. As discussed in more detail below, movement of switch member 30 causes the third contact 25 to flex or elastically deform, thereby moving the arms 28 and 29 into, and out of, contact with first electrical contact 21 and second electrical contact 23. Third contact 25 also includes a V-shaped central portion 31. In the illustrated example, the contacts 21, 23, and 25 are all integrally formed with electrical circuit elements 12 from sheet metal such as copper that has been stamped and cut, or otherwise formed into the required shapes. It will be understood that contacts 21 and 22 or other components may be made from separate pieces of metal or the like.

Figure 2:
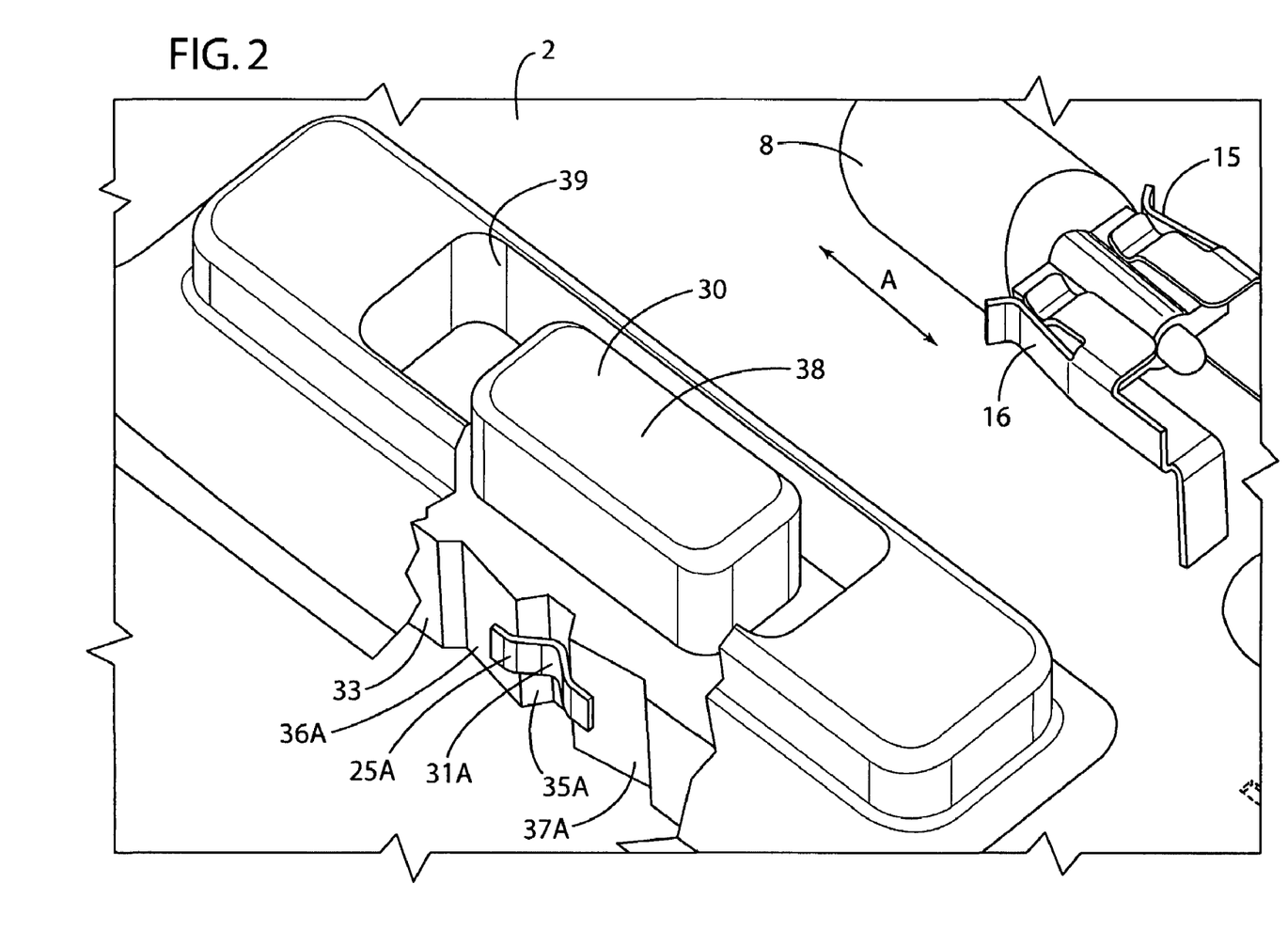
FIG. 2 is an enlarged fragmentary perspective view of the switch assembly of FIG. 1.
Figures 7, 8:
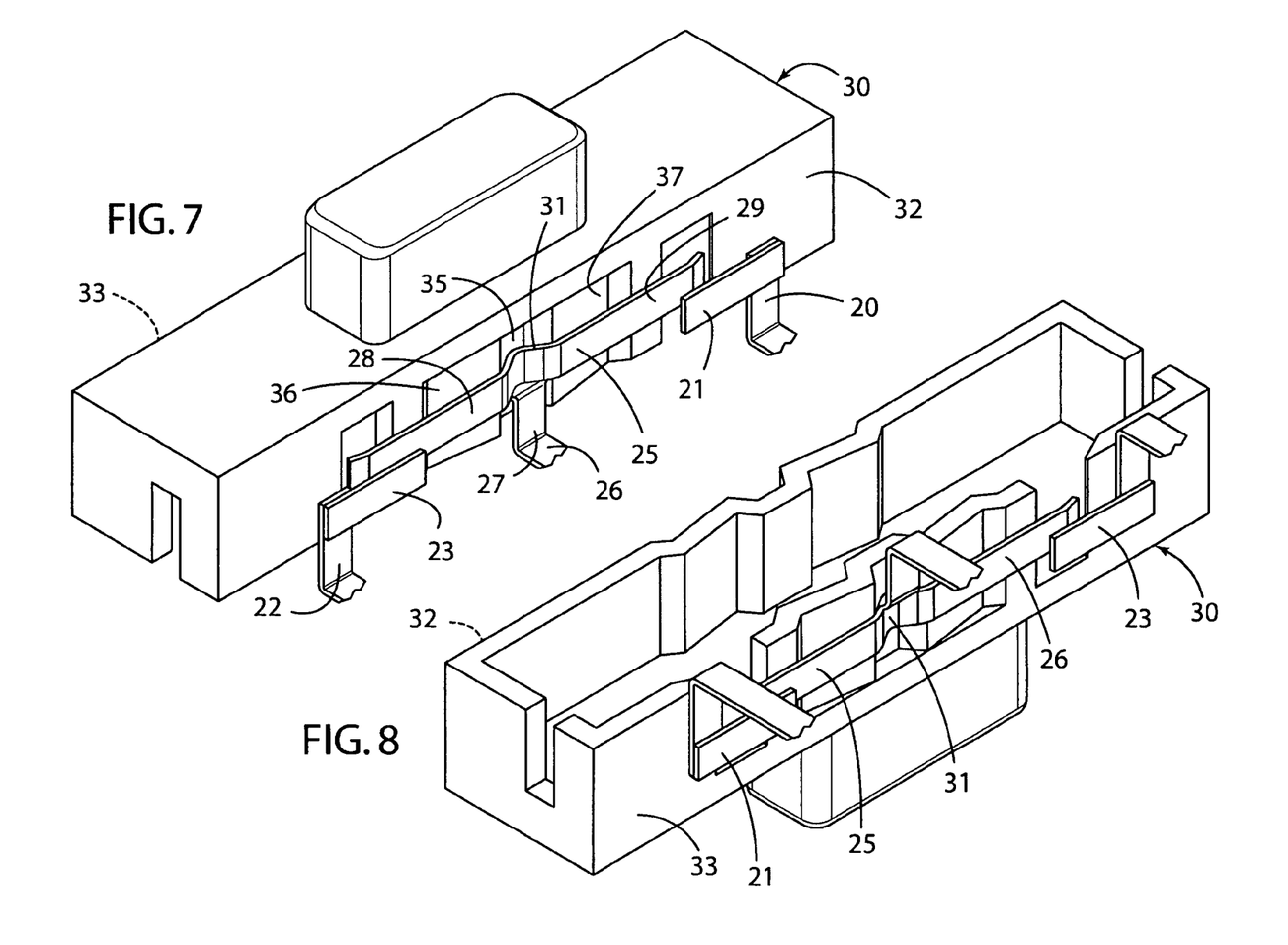
FIG. 7 is a partially fragmentary perspective view showing the sliding switch member and electrical contacts.
FIG. 8 is a partially fragmentary perspective view showing the sliding switch member and electrical contacts from another angle.

With further reference to FIGS. 2 and 3, switch member 30 includes opposite side faces 32 and 33 (see also FIGS. 7 and 8). The switch member 30 is disposed in an enlarged slot or cavity 34 in base structure 2. The slot or cavity 34 permits movement of switch member 30 back and forth in the direction of the arrow "A" (FIG. 3), but substantially restricts movement of switch member 30 relative to base 2 in a direction perpendicular to the arrow "A". A protrusion 38 of switch member 30 extends through a slot 39 (FIG. 2) in base 2 to provide a convenient contact surface that a user can push against to move the switch member 30 back and forth in the direction of the arrow "A".

Switch member 30 is preferably made of a polymer material or the like having a relatively low coefficient of friction when contacting base 2. With reference to FIG. 7, switch member 30 includes opposite side faces 32 and 33 having a plurality of notches forming detents. The configuration of the notches in switch member 30 is similar to known three-position switches having detents, such that the basic concept of detent notches, by itself, is not unique. Also, it will be understood that the shape and size of the detent notches may be adjusted to provide the proper tactile feel and retaining characteristics for a particular application. Switch member 30 includes a central notch or depression 35 in side face 32, a first outer notch or depression 36, and a second outer notch or depression 37. As switch member 30 is moved relative to the structural base 2, the V-shaped central portion 31 of third contact 25 engages the notches 35-37 to thereby form a detent tending to retain switch member 30 in a selected position corresponding to the detents formed by notches or depressions 35-37. With reference back to FIG. 2, side face 33 of switch member 30 includes a central notch or depression 35a and first and second outer notches or depressions 36a and 37a that are substantially identical to the notches or depressions 35-37, respectively. A resilient metal member 25a includes a V-shaped portion 31a that engages the notches or depressions 35a-37a to provide a detent function corresponding to the detent caused by engagement of V-shaped central portion 31 with depressions 35-37. In the illustrated example, the member 25a is not electrically connected, and merely provides a balanced force acting on side face 33 of switch member 30 to reduce or prevent binding and/or rotation of switch member 30 in cavity 34.

Figure 4:
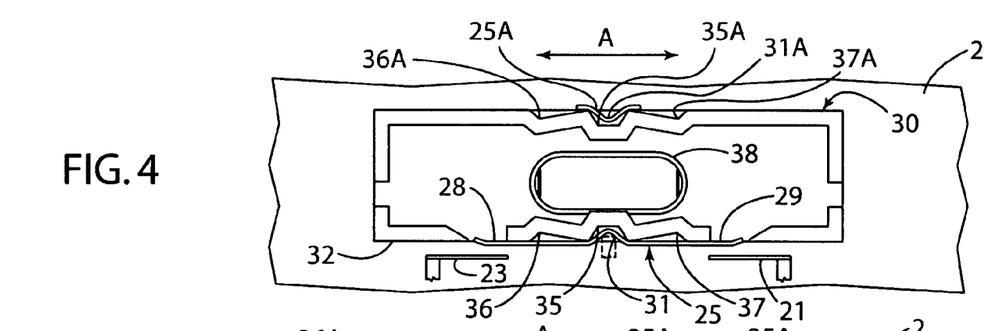
FIG. 4 is an enlarged view of the electrical switch of FIG. 1 in the center or OFF position.
Figure 5:
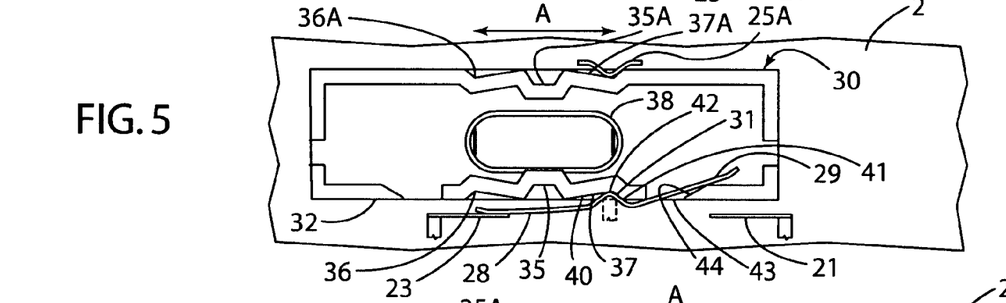
FIG. 5 is an enlarged view of the electrical switch of FIG. 1 in a first ON position.
Figure 6:
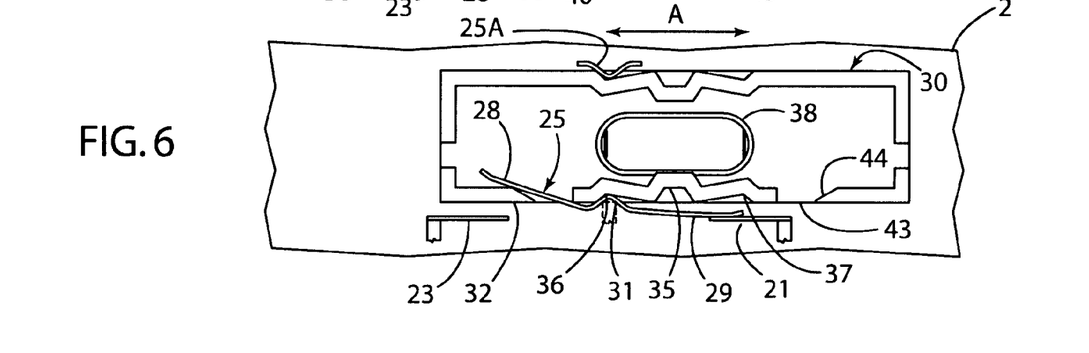
FIG. 6 is an enlarged view of the electrical switch of FIG. 1 in an automatic position.

With reference to FIGS. 4-6, when switch member 30 is in a center position the V-shaped central portion 31 of third contact 25 engages center notch or depression 35 in side face 32 of switch member 30. Third contact 25 is shaped such that it is biased into contact with center notch or depression 35, and switch member 30 is therefore retained in the center position shown in FIG. 4. When switch member 30 is in the center position illustrated in FIG. 4, the arms 28 and 29 of third contact 25 are spaced apart from contacts 21 and 23, such that no electrical connection is made between the contacts. If a small force is applied to the switch member 30 in the direction of the arrow "A". Third contact 25 will generate a force tending to retain the switch member 30 in the center position shown in FIG. 4. If a somewhat larger force is applied to switch member 30, the force generated by third contact 25 will be overcome, and the V-shaped central portion 31 will slide along surface 40 of second notch or depression 37. It will be understood that the amount of applied force required to move switch member 30 from a given position can be designed to meet a particular design requirement by changing the materials, geometry, and the like of the components. A second surface 41 of notch or depression 37 extends at an angle relative to the arrow "A" that is relatively large, and therefore restricts movement of the switch member 30 beyond the position illustrated in FIG. 5. It will be understood that the dimensions (e.g. length) of the cavity 34 may be designed to limit the travel of switch member 30 as well. When the V-shaped portion 31 is centered at the apex 42 of second notch or depression 37, arm 28 of third contact 25 contacts electrical contact 23, thereby forming a first state or circuit. The engagement of V-shaped portion 31 in notch or depression 37 forms a detent tending to retain the switch member 30 in the position illustrated in FIG. 5. Thus, the third contact 25 provides the dual function of making an electrical connection, and also provides a mechanical detent force tending to retain the switch member 30 in the position selected by the user. Engagement of member 25a in depressions 35a-37a also provides a substantially similar mechanical detent function, but, in the illustrated example, member 25a does not contact to the electrical components and therefore does not provide an electrical function. When switch member 30 is in the position illustrated in FIG. 5, arm 29 moves into opening 43 in side face 32 of switch member 30, and contacts edge surface 44 to elastically deform arm 29 somewhat, and thereby provide a force acting on third contact 25 tending to retain V-shaped central portion 31 in depression 37.

If a force is applied to switch member 30 in an opposite direction, switch member 30 will shift to the position illustrated in FIG. 6, wherein arm 29 of third contact 25 engages contact 21 to complete a different electrical connection. V-shaped central portion 31 of contact 25 engages notch or depression 36 in switch member 30 to form a detent tending to retain switch member 30 in the position illustrated in FIG. 6.

In the illustrated example, when switch member 30 is in the OFF or center position illustrated in FIG. 4, the electrical circuit formed by conductive elements 12 is configured to turn off light source 8 regardless of whether or not a vehicle door is open or closed. When switch member 30 is in a first or "ON" position illustrated in FIG. 5, the electrical circuit formed by conductive elements 12 is configured to supply electrical power and turn on light source 8 regardless of whether or not a vehicle door is open or closed. The conductive elements 12 are also configured to turn on light source 8 when switch member 30 is in the "automatic" position illustrated in FIG. 6 and the vehicle door is open, but turn off light source 8 if the vehicle door is closed. It will be readily understood that the electrical functions of conductive elements 12 may be configured in a variety of different ways to provide for a wide variety of applications utilizing three-way sliding switches. For example, the electrical functions of the switch in the positions of FIGS. 5 and 6 may be rearranged such that the "on" position and the "automatic" position are switched relative to the illustrated example. Also, the OFF position could be one of the end positions, and the ON position and the automatic position could be both to one side of the OFF position, with either of the ON and automatic positions located directly adjacent the OFF position. Furthermore, it will be appreciated that notches 35-37 could have a variety of shapes, and notches 36 and 37 do not need to be symmetric about center notch 35. The shape and/or size of notches 35-37 may be selected to provide the desired amount of detent force required for a particular application. Also, the switch may include only two positions (i.e., ON and OFF) rather than the three positions shown.

The light assembly 1 of the present application utilizes stamped metal electrical circuit elements that is economical to fabricate utilizing known production techniques. Because at least one of the conductive elements are configured to provide both a mechanical detent function and an electrically conductive function, the complexity and associated cost of the switch is thereby reduced.

In the foregoing description, it will be readily appreciated by those skilled in the art that modifications may be made to the invention without departing from the concepts disclosed herein. Such modifications are to be considered as included in the following claims, unless these claims by their language expressly state otherwise. As used herein, terms such as "first", "second", and the like do not in any way limit the relative positions or other aspects of the features so described, nor do such terms imply a sequence or order of operation, importance, or the like. Such terms are merely used to provide the reader with an understanding of what features is being described.

The invention claimed is:

1. An interior light assembly for vehicles, comprising:
   a base structure configured to be mounted in an interior of a vehicle;
   a switch member movably interconnected with the base structure, the switch member being movable relative to the base structure between an ON position, an OFF position, and an automatic position, the switch member including a first ON detent corresponding to the first ON position, an OFF detent corresponding to the OFF position, and a second detent corresponding to the automatic position;

an electrical circuit including first and second electrically conductive contacts on the base structure adjacent the switch member, wherein the electrical circuit is configured to receive a signal indicative of whether or not a vehicle door is opened or closed;

an electrically powered light source operably coupled to the electrical circuit;

an electrically conductive third contact on the base structure, the third contact operably engaging the first detent and the first contact when the switch member is in the ON position and forming a first electrical connection with the first contact, the third contact operably engaging the OFF detent when the switch member is in the OFF position, and wherein the third contact does not form an electrical connection with the first and second contacts when the switch member is in the OFF position, the third contact operably engaging the second detent and the second contact when the switch member is in the automatic position and forming a second electrical connection with the second contact; and wherein:

the third contact operably engages the first and second detents and the OFF detent and elastically deforms when the switch member is in the ON position and the automatic position, the third contact tending to remain in contact with the first and second contacts when the switch member is in the ON position and the automatic position and tends to remain out of contact with the first and second contacts when the switch member is in the OFF position; and the electrical circuit is configured to turn the light source ON if the switch member is in the ON position regardless of whether or not a vehicle door is open or closed, the electrical circuit turning the light source OFF when the switch member is in the OFF position regardless of whether or not a vehicle door is opened or closed, the electrical circuit turning the light source on when the switch member is in the automatic position and a vehicle door is open, the electrical circuit turning the light source OFF when the switch member is in the automatic position and a vehicle door is closed.

2. The interior light assembly of claim 1, wherein:
the switch member is slidably connected to the base structure and translates linearly between the ON position, the automatic position, and the OFF position, and wherein the OFF position is in between the ON position and the automatic position.

3. The interior light assembly of claim 1, wherein:
the base structure and channel-like structure defining opposite side faces; and wherein:
the switch member is slidably disposed in the channel-like structure between the opposite side faces.

4. An interior light assembly for vehicles, comprising:
a base structure configured to be mounted in an interior of a vehicle;
a switch member movably interconnected with the base structure, the switch member being movable relative to the base structure between an ON position, an OFF position, and an automatic position, the switch member including a first ON detent corresponding to the first ON position, an OFF detent corresponding to the OFF position, and a second detent corresponding to the automatic position;

an electrical circuit including first and second electrically conductive contacts on the base structure adjacent the switch member, wherein the electrical circuit is configured to receive a signal indicative of whether or not a vehicle door is opened or closed;

an electrically powered light source operably coupled to the electrical circuit;

an electrically conductive third contact on the base structure, the third contact operably engaging the first detent and the first contact when the switch member is in the ON position and forming a first electrical connection with the first contact, the third contact operably engaging the OFF detent when the switch member is in the OFF position, and wherein the third contact does not form an electrical connection with the first and second contacts when the switch member is in the OFF position, the third contact operably engaging the second detent and the second contact when the switch member is in the automatic position and forming a second electrical connection with the second contact; and wherein:

the third contact operably engages the first and second detents and the OFF detent and elastically deforms when the switch member is in the ON position and the automatic position, the third contact tending to remain in contact with the first and second contacts when the switch member is in the ON position and the automatic position and tends to remain out of contact with the first and second contacts when the switch member is in the OFF position; and the electrical circuit is configured to turn the light source ON if the switch member is in the ON position regardless of whether or not a vehicle door is open or closed, the electrical circuit turning the light source OFF when the switch member is in the OFF position regardless of whether or not a vehicle door is opened or closed, the electrical circuit turning the light source on when the switch member is in the automatic position and a vehicle door is open, the electrical circuit turning the light source OFF when the switch member is in the automatic position and a vehicle door is closed, and wherein;

the third contact comprises a base portion fixed to the base structure, an intermediate support portion extending away from the base portion, and a movable end portion comprising a pair of arms extending away from the intermediate support portion.

5. The interior light assembly of claim 4, wherein:
the third contact has a one-piece stamped metal construction and a substantially uniform thickness.

6. The interior light assembly of claim 5, wherein:
the base structure is made of a polymer material; and
the base portion of the third contact is embedded in the base structure.

7. The interior light assembly of claim 6, wherein:
the base portion of the third contact is integrally formed with the electrical circuit.

8. The interior light assembly of claim 7, wherein:
the electrical circuit is coupled to an electrical power source of a vehicle, and the electrical circuit includes electrical connectors protruding from the base structure, and wherein at least one of the electrical connectors is operably connected to a selected one of the first and second contacts; and wherein:
the light source is coupled to the electrical connectors and emits light when the switch member is in one of the ON position and the automatic position corresponding to the selected one of the first and second contacts.

9. The interior light assembly of claim 6, wherein:
the intermediate portion of the third contact extends transversely from the base portion, and the arms have base portions integrally formed with the intermediate portion, the arms extending in opposite directions away from the intermediate portion to form a T-shape, the third contact including V-shaped bend proximate the base portions of the arms that protrudes outwardly and engages the first and second ON detents and the OFF detent of the switch member.

10. The interior light assembly of claim 9, wherein:
the first and second detents and the OFF detent comprise first and second depressions, and an OFF depression in the switch member, and wherein:
the third contact is in a substantially free, non-elastically deformed state when the V-shaped bend is disposed in the OFF depression;
the third contact is elastically deformed in a first direction when the V-shaped bend is disposed in the first depression; and
the third contact is deformed in a second direction that is different than the first direction when the V-shaped bend is disposed in the second depression.

11. The interior light assembly of claim 10, wherein:
the switch member defines first and second opposite side faces, and the first, second, and OFF depressions are formed in the first opposite side face, and wherein:
the switch includes depressions in the second opposite side face having substantially the same shape as the first, second, and OFF depressions in the first side face; and including:
a flexible detent member having a V-shaped portion configured to engage the depressions in the second side face to generate a force that varies as the switch member moves relative to the base.

12. The interior light assembly of claim 10, wherein:
the switch member moves along a substantially linear slide path relative to the base structure;
the OFF depression is centrally located on the switch member between the first and second depressions, the OFF depression having first and second contacts surfaces configured to engage opposite sides of the V-shaped bend of the third contact, the first and second contact surfaces having substantially the same shape and orientation relative to the slide path;
the first and second depressions comprise first and second contact surfaces forming an angle relative to one another that is substantially greater than ninety degrees, and wherein the first contact surfaces of the first and second depressions define a first angle relative to the slide path, and the second contact surfaces of the first and second depressions define a second angle relative to the slide path that is substantially greater than the first angle.

13. The interior light assembly of claim 12, wherein:
the first and second depressions are mirror images of one another.

14. An interior light assembly for vehicles, comprising:
a base structure for mounting in an interior of a vehicle;
a switch member movably mounted to the base for movement between an ON position, an automatic position, and an OFF position;
an electrically conductive circuit associated with the base structure;
a light source coupled to the circuit;
first and second electrically conductive contacts connected to the electrical circuit;
a third electrically conductive contact member connected to the base, the third contact member elastically deforming upon engagement with the switch member when the switch member is in the ON position into a first configuration wherein the third contact member contacts the first contact and wherein the deformation of the third contact member forms a detent tending to retain the switch member in the ON position.

15. An interior light assembly for vehicles, comprising:
a base structure for mounting in an interior of a vehicle;
a switch member movably mounted to the base for movement between an ON position, an automatic position, and an OFF position;
an electrically conductive circuit associated with the base structure;
a light source coupled to the circuit;
first and second electrically conductive contacts connected to the electrical circuit;
a third electrically conductive contact member connected to the base, the third contact member elastically deforming upon engagement with the switch member when the switch member is in the ON position into a first configuration wherein the third contact member contacts the first contact and wherein the deformation of the third contact member forms a detent tending to retain the switch member in the ON position, and wherein:
the third electrically conductive contact member elastically deforms upon engagement with the switch member when the switch member is in the automatic position into a second configuration wherein the third contact member contacts the second contact and wherein the deformation of the third contact member forms a detent tending to retain the switch member in the automatic position.

16. The interior light assembly of claim 15, wherein:
the third contact member engages the switch member when the switch member is in the OFF position and forms a detent tending to retain the switch member in the OFF position wherein the third contact member is out of contact with the first and second contacts.

17. The interior light assembly of claim 16, wherein:
the base structure is made of a polymer material and at least a substantial portion of the electrical circuit is embedded in the polymer material; and wherein:
the third contact is integrally formed with a portion of the electrical circuit and has substantially the same thickness as the substantial portion of the electrical circuit that is embedded in the polymer material.

18. A three-position sliding electrical switch assembly, comprising:
a base structure;
electrical conductors associated with the base;
a switch member movably mounted to the base for movement between first, second, and third positions;
first and second electrical contacts coupled to the electrical conductors;
a detent structure comprising a plurality of notches on a selected one of the base structure and the switch member;
a third electrical contact that contacts the first contact when the switch member is in the first position, the second electrical contact contacting the second contact when the switch is in the second position, the third electrical contact is out of contact with the first contact and out of contact with the second contact when the switch member is in the third position, wherein:

the third contact operably engages the detent structure and forms a detent tending to retain the switch member in a selected one of the first, second and third positions when the switch member is in the selected one of the first, second and third positions.

19. A three-position sliding electrical switch assembly, comprising:
- a base structure;
- electrical conductors associated with the base;
- a switch member movably mounted to the base for movement between first, second, and third positions;
- first and second electrical contacts coupled to the electrical conductors;
- a detent structure comprising a plurality of notches on a selected one of the base structure and the switch member;
- a third electrical contact that contacts the first contact when the switch member is in the first position, the second electrical contact contacting the second contact when the switch is in the second position, the third electrical contact is out of contact with the first contact and out of contact with the second contact when the switch member is in the third position, wherein:

the third contact operably engages the detent structure and forms a detent tending to retain the switch member in a selected one of the first, second and third positions when the switch member is in the selected one of the first, second and third positions, and wherein:

the notches are formed in the switch member.

20. The three-position sliding electrical switch assembly of claim 19, wherein:

the third contact includes a protrusion received in the notches.

* * * * *